US006435204B2

(12) United States Patent
White et al.

(10) Patent No.: US 6,435,204 B2
(45) Date of Patent: Aug. 20, 2002

(54) FUEL DISPENSING SYSTEM

(75) Inventors: John G. White, Box Hill North (AU); Ronald Robson Hymers, Sunbury-on-Thames (GB)

(73) Assignee: BP Oil International Limited, London (GB)

( * ) Notice: Subject to any disclaimer, the term of this patent is extended or adjusted under 35 U.S.C. 154(b) by 0 days.

(21) Appl. No.: 09/791,834

(22) Filed: Feb. 26, 2001

(Under 37 CFR 1.47)

Related U.S. Application Data

(63) Continuation of application No. 09/570,952, filed on May 15, 2000, now abandoned, which is a continuation of application No. PCT/GB98/03374, filed on Nov. 11, 1998.

(30) Foreign Application Priority Data

Nov. 14, 1997 (AU) ........................................... 04097/97

(51) Int. Cl.[7] ............................ G05D 7/00; B67D 5/04

(52) U.S. Cl. .................................... 137/234.6; 137/364

(58) Field of Search ............................. 137/234.6, 363, 137/364, 377; 141/387

(56) References Cited

U.S. PATENT DOCUMENTS

| | | | | |
|---|---|---|---|---|
| 3,915,206 A | * | 10/1975 | Fowler et al. | 141/59 |
| 3,995,769 A | * | 12/1976 | Kuwabara et al. | 222/26 |
| 4,993,463 A | * | 2/1991 | Von Meyerinck et al. | 137/234.6 |
| 6,209,569 B1 | * | 4/2001 | Sharp | 137/234.6 |

FOREIGN PATENT DOCUMENTS

| | | | | |
|---|---|---|---|---|
| WO | WO 99/25644 | * | 5/1999 | 137/234.6 |

* cited by examiner

*Primary Examiner*—Kevin Lee
(74) *Attorney, Agent, or Firm*—Nixon & Vanderhye

(57) ABSTRACT

Dispensing system for automotive fuel including a casing mounted within the ground and containing a fuel flow meter and an associated valve. The meter is linked by a fuel line to a fuel tank. An above-ground structure is provided for supporting a dispensing hose to which the meter and associated valve within the casing are linked by a delivery line passing externally of the casing. The casing is adjacent to but separate from the above-ground structure whereby the aboveground structure is mounted independently of the casing.

12 Claims, 2 Drawing Sheets

FUEL DISPENSING SYSTEM

This is a continuation of application Ser. No. 09/570,952 filed May 15, 2000, now abandoned, which is a continuation of PCT/GB98/03374 filed Nov. 11, 1998.

The present invention relates to fuel dispensing systems and more particularly to fuel dispensing systems for dispensing gasoline, liquefied petroleum gas or diesel engine fuel for automotive use.

BACKGROUND OF THE INVENTION

Conventionally, filling stations for dispensing fuel for automotive use comprise a series of pumping or dispensing units on the forecourt of the filling station. Each unit is connected to a remote storage tank from which fuel is withdrawn when a user removes the filling nozzle from a storage cradle on the dispensing unit and actuates the dispensing trigger on the nozzle. The dispensing unit may have a single outlet or multiple outlets. For each respective outlet the dispensing unit includes a meter and an air eliminator/solenoid valve within the fuel line upstream of a connector for the dispensing hose. The meter accurately records the amount of fuel dispensed at each operation with corresponding data being transmitted to a display at or adjacent to the dispensing unit and, usually, also to a cashier's unit. The air eliminator acts to eliminate air from the fuel line while the solenoid valve opens or closes the fuel line to control the flow of fuel to the dispensing hose.

Traditionally, each dispensing unit is mounted above-ground on a suitable base, with the meters and air eliminator/solenoid valves and other pumping-associated equipment being installed within the lower part of the casing of the dispensing unit. As a result, the casing of the dispensing unit at least in its lower part is relatively bulky. The bulkiness of the casing restricts access to the dispensing unit and as a result access is normally restricted to a predetermined position in a lane at one or both sides of the dispensing unit. Also, the dispensing unit is prone to damage by careless drivers, resulting in the necessity for relatively frequent repair of the casing and of components within the casing which might be damaged as a result of low speed impact by a vehicle.

SUMMARY OF THE INVENTION

According to the present invention, there is provided a dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked. Preferably the meter and associated valve within the casing are linked to the dispensing hose by a delivery line passing externally of the casing, the casing being adjacent to but separate from the above-ground structure whereby the above-ground structure is mounted independently of the casing.

Further according to the invention, there is provided a dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby the above-ground structure can be located (and preferably is located) in a selected position independent of the position of the casing.

Still further according to the invention, there is provided a dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being separate from the above-ground structure whereby the structure can be located (and preferably is located) in a selected position wholly to one side of the casing.

Still further according to the invention, there is provided a dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby each is supported from the ground independently of the other. There may be more than one above ground structure (supporting the hose), and at least one of said structures may be supported by the ground independently of another.

The casing may also be described herein as a housing.

When the dispensing system has multiple outlets, the housing within the ground usually includes a meter and associated valve for each outlet, and the above-ground structure usually carries a hose for each outlet, each hose being coupled to the associated valve and meter by a separate delivery line.

Advantageously, the housing within the ground has a removable cover at or adjacent ground level, the cover preferably being of sufficient strength to carry the weight of a vehicle.

Advantageously, the above-ground structure can be in the form of a column especially with the delivery line for the or each hose passing externally of the casing and upwardly along the column and the hose is suspended from a fitting at an upper end of the delivery line.

BRIEF DESCRIPTION OF THE DRAWINGS

An embodiment of the invention will now be described, by way of example only, with reference to the accompanying drawings, in which.

DETAILED DESCRIPTION OF THE PREFERRED EMBODIMENTS

Figure 1:
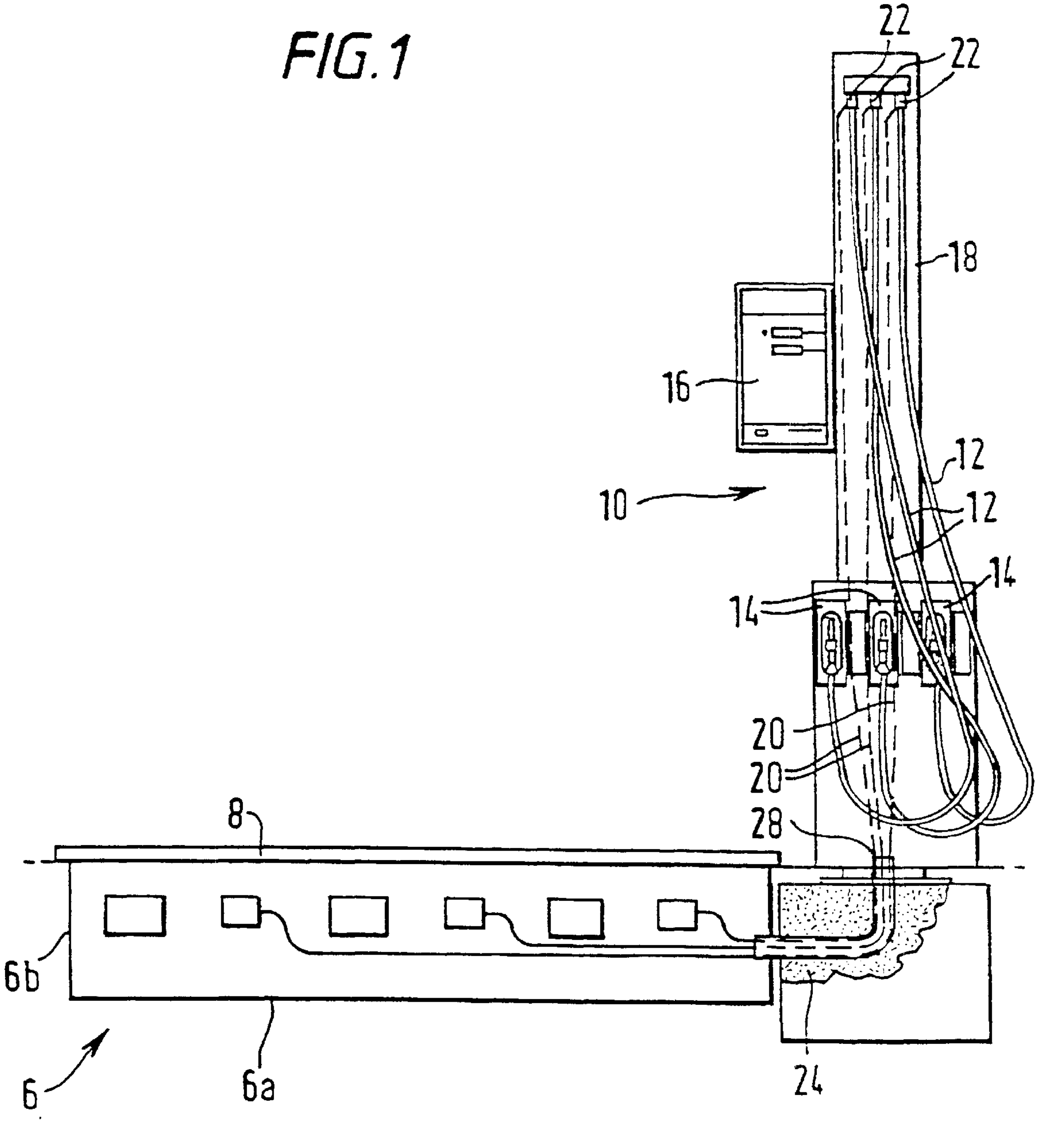
FIG. 1 is a schematic vertical section of a dispensing system in accordance with a preferred embodiment of the invention and comprising an in-ground housing and above-ground structure.
Figure 2:
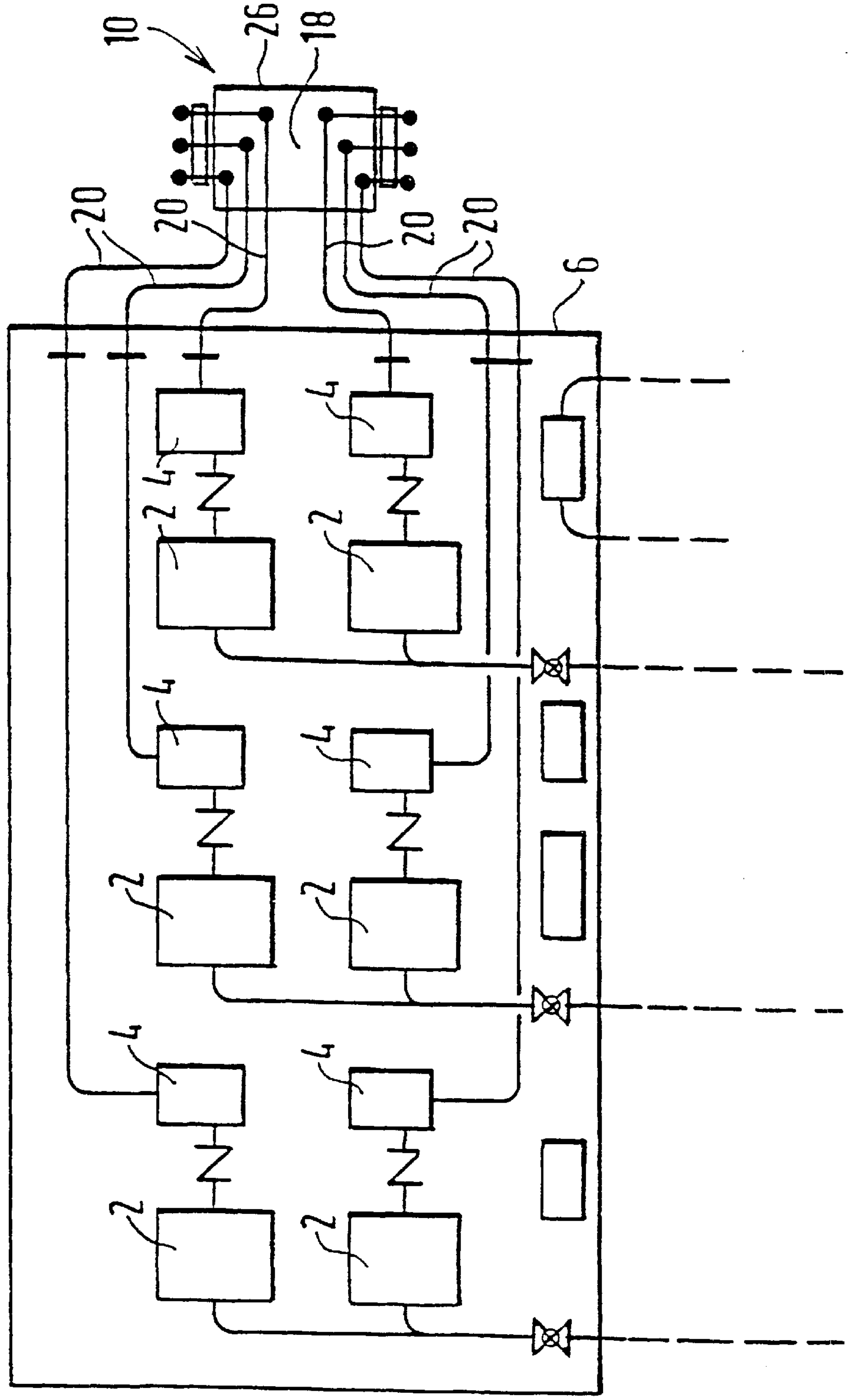
FIG. 2 is a plan view showing schematically the arrangement of components within the in-ground housing.

The dispensing system of the preferred embodiment of the invention has conventional flow meters 2 and air eliminator/solenoid valves 4 housed within a casing or sump 6 within the ground and closed by a cover 8 substantially at ground level, the casing 6 having a bottom wall 6*a* and a side wall 6*b*. The casing 6 may also contain associated electronic components such as electrical switching boxes and junction boxes. With this arrangement the substantive structure of the dispensing system situated above ground level adjacent to the casing 6 can then simply consist of structure 10 sufficient to carry the dispensing hoses 12 and cradles 14 for the nozzles, and also a display 16 for viewing by the user, e.g. of sales information such as volume and/or sales price of fuel. More particularly, the structure 10 can thus be in the form of a relatively slender column 18, and/or may be a hollow structure comprising a support framework or column having external cladding 26 as shown. As shown, fuel lines 20 extend from the casing 6 downstream of the air eliminator/solenoid valves 4 and pass through the column foundation 24 via flexible connections 28 and then upwardly along the column 18, or preferably through the column 18 especially inside the cladding 26, to upper hose connectors 22, the fuel lines 20 preferably exiting the casing 6 by passage through the side wall 6*a*. The dispensing hoses 12 hanging downwardly from the connectors 22 have conventional nozzles at their outlet ends and the lower part of the structure 10 simply needs to be of sufficient size to accommodate a respective cradle 14 for the or each of the nozzles.

The system just described is designed for dispensing gasoline or diesel fuel. A corresponding system for dispensing liquefied petroleum gas (LPG) will be substantially the same as that described but with the meters and associated valving with the casing 6 being of a design appropriate to that particular fuel.

By the step of mounting the fuel meters, air eliminator/solenoid valves and possibly other components in a separate casing beneath the ground rather than in an above-ground casing, the area of the above-ground structure can be significantly reduced, particularly the area of the lower part thereof This provides a number of significant advantages. The reduced area of the lower part of the above-ground structure enables greater access to vehicles within a given forecourt area which can, in turn, lead to the possibility of significant redesign away from the traditional concept of filling lanes arranged in parallel. In other words it provides far greater versatility in the design of the layout of the forecourt enabling within the area of the forecourt a greater number of dispensing outlets and/or quicker access of vehicles to and from each outlet, particularly when the upper surface of the cover 8 is at ground level and is designed to carry the weight of a vehicle whereby vehicles could possibly be driven across the cover 8. Also the location of the meters and air eliminator/solenoid valves in a separate casing underground removes these relatively sensitive components from the risk of damage arising from low speed impact by a vehicle. Although the dispensing system still has above-ground structure which might be damaged by a vehicle, that structure is not usually enclosing damage-sensitive components. At most, damage arising from vehicle impact is likely to involve replacement of one or two relatively inexpensive metal or plastics panels which may have been used for cladding in the above-ground structure e.g. the column. It would be possible for the above-ground structure just to consist of a substantially solid column for supporting the hoses, nozzles, and display and which could be almost totally resistant to most low speed vehicle impacts which are likely to occur in practice.

It will be noted from FIG. 1 that due to the separation of the in-ground casing 6 and above-ground structure 10 these components are separately mounted to the ground with the structure 10 being to one side of the casing 6. This means that there is added versatility in the relative placement of the casing 6 and above-ground structure 10 to suit the required design of the forecourt. Also as there is no structural relationship between the casing 6 and above-ground structure 10, the casing 6 does not impose constraints on the design of the structure 10 and, hence, there is significant versatility in the design of the structure 10; for example although as previously discussed the structure 10 could consist of a column which could be quite slender if it is just supporting the hoses, nozzles and display, the structure 10 could form a more substantial column which also acts as a support for the overhead canopy or roof of the forecourt. There may also be a canopy or roof (not shown) but with at least one above-ground structure (supporting the hose 12) independent thereof and not supporting the canopy or roof The embodiment has been described by way of example only and modifications are possible within the scope of the invention.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

We claim:

1. A dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby the above-ground structure is mounted independently of the casing.

2. A system according to claim 1 wherein the casing has a bottom wall and a side wall and the delivery line passes through the side wall of the casing.

3. A system according to claim 1 wherein access to the interior of the casing is via a removable top cover.

4. A system according to claim 3 wherein the upper surface of the top cover is substantially at ground level and the strength of the cover is sufficient to carry the weight of a vehicle driven over the cover.

5. A system according to claim 1 having multiple outlets, wherein the casing includes a meter and associated valve for each outlet and the above-ground structure carries a hose for each outlet, the respective hoses being coupled to the associated valve and meter by a separate delivery line.

6. A system according to claim 1 wherein the above-ground structure comprises a column.

7. A system according to claim 6 wherein the delivery line for each hose passes externally of the casing and upwardly along the column and the hose is suspended from a fitting at an upper end of the delivery line.

8. A system according to claim 7 wherein the column provides support for an overhead canopy of the forecourt.

9. A dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby the above-ground structure can be located in a selected position independent of the position of the casing.

10. A dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby the structure can be located in a selected position wholly to one side of the casing.

11. A dispensing system for automotive fuel, said system comprising a casing mounted within the ground and containing a fuel flow meter and an associated valve, said meter being linked by a fuel line to a fuel tank, said dispensing system further comprising above-ground structure supporting a dispensing hose to which the meter and associated valve within the casing are linked by a delivery line passing externally of the casing, the casing being adjacent to but separate from the above-ground structure whereby each is supported from the ground independently of the other.

12. A dispensing system for automotive fuel, said system comprising a casing mounted within the ground and containing a fuel flow meter and an associated valve, said meter being linked by a fuel line to a fuel tank, said dispensing system further comprising above-ground structure that is a column supporting a dispensing hose to which the meter and associated valve within the casing are linked by a delivery line and wherein the delivery line for the or each hose passes externally of the casing and upwardly along the column and the hose is suspended from a fitting at an upper end of the delivery line.

* * * * *